United States Patent [19]

Tanaka et al.

[11] Patent Number: 5,122,611
[45] Date of Patent: Jun. 16, 1992

[54] METHOD OF PRODUCING AZOMETHINE OR INDOANILINE SERIES DYES

[75] Inventors: Mitsugu Tanaka; Hisashi Mikoshiba, both of Kanagawa, Japan

[73] Assignee: Fuji Photo Film Co., Ltd., Kanagawa, Japan

[21] Appl. No.: 571,068

[22] Filed: Aug. 23, 1990

[30] Foreign Application Priority Data

Aug. 23, 1989 [JP] Japan ................... 1-216459

[51] Int. Cl.$^5$ .................. C07D 249/08; C07D 215/02
[52] U.S. Cl. .................. 548/262.4; 546/94; 546/166; 546/168; 546/158; 548/359; 548/365; 548/366; 548/545; 549/72; 549/467; 549/468; 549/480; 558/10
[58] Field of Search .............. 564/185, 167, 169, 157, 564/158; 548/262.4, 359, 324, 569, 227, 312, 363, 258, 252, 250, 254, 545, 365, 366; 546/166, 94, 168, 569, 158; 549/72, 480, 467, 468; 558/10

[56] References Cited

U.S. PATENT DOCUMENTS 3,507,872 4/1970 Hegar et al. .................. 546/158
4,122,117 10/1978 Ando et al. .................. 546/158

Primary Examiner—Mukund J. Shah
Assistant Examiner—Y. N. Gupta
Attorney, Agent, or Firm—Sughrue, Mion, Zinn, Macpeak & Seas

[57] ABSTRACT

A method for producing an azomethine or indoaniline series dye, which comprises oxidatively condensing an active methylene- or methine-containing compound, except those containing a sulfonic or carboxylic acid group, and p-phenylenediamine, except those containing a sulfonic or carboxylic acid group, in the presence of methylene chloride as a solvent under a basic condition.

8 Claims, No Drawings

METHOD OF PRODUCING AZOMETHINE OR INDOANILINE SERIES DYES

FIELD OF THE INVENTION

This invention relates to a method of producing azomethine or indoaniline series dyes which are compounds useful for photographic light-sensitive materials and thermal transfer materials.

BACKGROUND OF THE INVENTION

The most widely used method for synthesizing an azomethine or indoaniline series dye consists of an oxidative condensation reaction between an active methylene- or methine-containing compound and a p-phenylenediamine in the presence of a base and an oxidizing agent. However, the dye product is present together with the oxidizing agent and the base reagents used if the reaction is carried out in a one-phase system. Therefore, the method suffers from disadvantages in that the dye product decomposes to yield undesirable by-products, a good deal of solvent is required in producing a water-insoluble dye, and so on.

In an effect to overcome these disadvantages, a method has been proposed in which the reaction is conducted in an ethyl acetate-water two-phase system, as disclosed, for example, in JP-A-59-182839 (The term "JP-A" as used herein means an unexamined published Japanese patent application), JP-A-01-110985. According to this method, the produced dyes are extracted with ethyl acetate, and, therefore, separated from both the oxidizing agent and base which are present in the aqueous phase, so the decomposition of the produced dyes is reduced. In addition, the amount of solvent can be reduced in quantity as compared with one-phase systems. However, azomethine or indoaniline series dyes which have been used in particular for thermal transfer processes possess insufficient solubility in ethyl acetate. Consequently, it is still necessary to use ethyl acetate in a large quantity, though the quantity is smaller than that in one-phase systems, resulting in a considerable lowering of productivity and a sharp increase of production cost.

On the other hand, a decrease in the amount of ethyl acetate causes an increase in the amount of by-products to lower the yield rate and also causes problems in separation due to premature precipitation of crystalline dye during the reaction or the solution-separating procedure to complicate the numbers of procedures necessary to isolate the dye product. These drawbacks represent serious problems from the standpoint of production efficiency.

Also, chloroform-water systems are disclosed as another two-phase system in JP-A-63-264753 and JP-A-64-51991. Owing to much higher solubilities of azomethine or indoaniline dyes in chloroform than in ethyl acetate, the above-mentioned disadvantages associated with the ethyl acetate-water system are avoided. However, chloroform has high toxicity, and such systems have a question as to their yield rate, as described hereinafter. Therefore, production methods free from the foregoing defects have been desired.

SUMMARY OF THE INVENTION

An object of this invention is to provide a method for producing azomethine or indoaniline series dyes which overcome the foregoing defects associated with the above-discussed conventional systems.

The present inventors have discovered that this above-described object is attained with a method of producing azomethine or indoaniline series dyes which comprises oxidatively condensing active methylene- or methine-containing compounds (except those which contain one or more of a sulfonic or carboxylic acid group) and p-phenylenediamines (except those which contain one or more of a sulfonic or carboxylic acid group) in the presence of methylene chloride under a basic condition.

Accordingly, this invention is characterized by the use of methylene chloride instead of ethyl acetate or chloroform.

More specifically, the invention is of a great advantage from a productional point of view in that the solvent can be sharply reduced in quantity because of exceedingly high solubilities of azomethine or indoaniline series dyes in methylene chloride as compared with ethyl acetate. In addition, methylene chloride can be more easily handled than chloroform because its toxicity is far lower. Further, the dye yield rate of the reaction in the methylene chloride-water two-phase system is higher than in the chloroform-water two-phase system. In particular, difference in yield rate between these two systems becomes greater the lower the rate of stirring speed. It is possible that this difference results from lowness of specific gravity of methylene chloride ($d=1.33$), compared with that of chloroform ($d=1.50$), because the reaction in the two-phase systems utilizing water is presumed to proceed at the interface, and therefore to retard in the case of chloroform with great specific gravity. Since the stirring speed can only be increased only so far in the production on an industrial scale, this advantage of methylene chloride is of great importance.

DETAILED DESCRIPTION OF THE INVENTION

The p-penylenediamines can be used in the present invention without any particular limitation, except that the p-phenylenediamines contain neither sulfonic nor carboxylic acid groups. The p-penylenediamines represented by the following general formula (I) are preferably used:

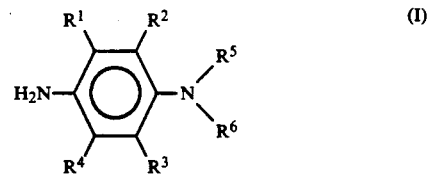

, wherein $R^1$, $R^2$, $R^3$ and $R^4$ each represents a hydrogen atom, a halogen atom, an alkyl group, an alkoxy group, an aryl group, an aryloxy group, a cyano group, an acylamino group, a sulfonylamino group, an ureido group, an alkoxycarbonylamino group, an alkylthio group, an arylthio group, an alkoxycarbonyl group, a carbamoyl group, a sulfamoyl group, a sulfonyl group or an acyl group; $R^5$ represents an alkyl group or an aryl group, and $R^6$ represents a hydrogen atom or may be the same as $R^5$; and further, $R^5$ and $R^6$ may combine with each other to complete a ring; and furthermore, $R^2$ and $R^5$, and/or $R^3$ and $R^6$ may combine with each other to complete a ring. In addition, each group representing from $R^1$ to $R^6$ may be substituted or unsubstituted.

Among the compounds represented by the foregoing general formula (I) as defined above, preferred compounds are described below.

Substituents preferred as $R^1$ include a hydrogen atom, alkyl groups containing 1 to 4 carbon atoms, halogen atoms (especially fluorine and chlorine), alkoxy groups containing 1 to 4 carbon atoms, acylamino groups containing 2 to 5 carbon atoms, sulfonyl groups containing 1 to 4 carbon atoms, and alkoxycarbonylamino groups containing 2 to 5 carbon atoms.

Substituents preferred as groups $R^2$, $R^3$ and $R^4$ are hydrogen atoms.

Combinations preferred for that of $R^5$ with $R^6$ include a proviso wherein $R^5$ and $R^6$ are both an unsubstituted alkyl group containing 1 to 6 carbon atoms, and an arrangement wherein $R^5$ is a substituted alkyl group containing 2 to 10 carbon atoms (whose substituent group is selected from among cyano, alkoxy, acylamino, halogen, alkoxycarbonyl, alkoxycarbonyloxy, alkoxycarbonylamino, aminocarbonylamino, carbamoyl, acyloxy, acyl and hydroxyl groups) and $R^6$ is an unsubstituted alkyl group containing 1 to 6 carbon atoms.

Specific non-limiting examples of compounds represented by the general formula (I) are illustrated below.

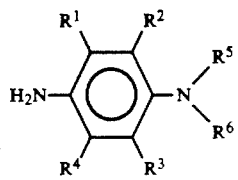

| Compound No. | $R^1$ | $R^2$ | $R^3$ | $R^4$ | $R^5$ | $R^6$ |
|---|---|---|---|---|---|---|
| I-1 | H | H | H | H | $-C_2H_5$ | $-C_2H_5$ |
| I-2 | $-CH_3$ | " | " | " | " | " |
| I-3 | $-C_2H_5$ | " | " | " | " | " |
| I-4 | $-CH_3$ | " | " | " | " | H |
| I-5 | H | " | " | " | $-C_3H_7$ | $-C_3H_7$ |
| I-6 | $-OCH_3$ | " | " | " | $-C_2H_5$ | $-C_3H_7$ |
| I-7 | $-NHCOCH_3$ | " | " | " | " | $-C_2H_5$ |
| I-8 | $-NHCOOCH_3$ | " | " | " | " | " |
| I-9 | $-CH_3$ | " | " | " | $-C_2H_4OCOCH_3$ | " |
| I-10 | H | " | " | " | $-C_2H_4CN$ | " |
| I-11 | F | " | " | " | $-C_2H_4NHCOCH_3$ | " |
| I-12 | $-CH_3$ | " | " | " | $-C_2H_4COOC_2H_5$ | " |
| I-13 | $-CH_3$ | " | " | " | $-C_2H_4OCH_3$ | " |
| I-14 | H | " | " | " | $-C_2H_4OC_2H_5$ | " |
| I-15 | $-CH_3$ | " | " | " | " | $-C_2H_4OC_2H_5$ |
| I-16 | " | " | " | " | $-C_2H_4OH$ | $-C_2H_5$ |
| I-17 | " | " | " | " | $-C_2H_4Cl$ | $-C_4H_9$ |
| I-18 | H | " | " | " | ⌬ | $-C_2H_5$ |
| I-19 | $-CH_3$ | " | " | " | $-C_2H_4NHSO_2CH_3$ | " |
| I-20 | " | " | " | " | $-CH_3$ | $-CH_3$ |
| I-21 | H | " | " | " | $-C_2H_4OCOCH_3$ | $-C_2H_5$ |
| I-22 | H | F | " | " | $-C_2H_5$ | H |

No. I-23

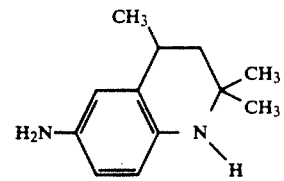

No. I-24

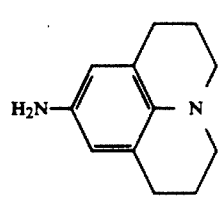

No. I-25

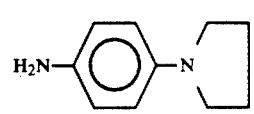

| No. I-26 | 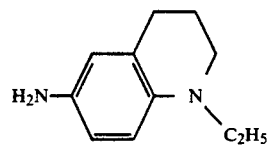 |
|---|---|

Among them, I-1, I-2, I-9, I-12, and I-13 are particularly preferable in the present invention.

As for the active methylene- or methine-containing compounds, any such compounds may be used in the practice of the present invention except those which contain either a sulfonic or carboxylic acid group, and the compound must produce azomethine or indoaniline series dyes by undergoing an oxidative condensation reaction with p-phenylenediamines under basic conditions. The term "active methylene or methine" as used herein means a methylene or methine group adjacent to a group or groups having high electronegativity".

Those active methylene- or methine-containing compounds are represented by the following general formulae (II), (III), (IV), (V), (VI) and (VII), respectively, are preferred as the above-described compounds. In particular, those represented by the general formula (V)-a, (VI) or (VII) are the most preferred. Active methylene or methine groups in the active methylene- or methine-containing compounds represented by the general formulae (II), (III), (IV), (V)-a, (V)-b, (V)-c, (V)-d, (V)-e, (VI), and (VII) are the groups bonded to $X^1$, $X^2$, $X^3$, $X^4$, $X^5$, $X^6$, $X^7$, $X^8$, $X^9$, and $X^{10}$, respectively.

$$R^7-\underset{\underset{O}{\|}}{C}-\underset{\underset{X^1}{|}}{CH}-\underset{\underset{O}{\|}}{C}-NH-R^8 \qquad (II)$$

In formula (II), $R^7$ represents an alkyl group (preferably containing 1 to 10 carbon atoms) or an optionally substituted phenyl group (whose substituent group is preferably an alkyl or alkoxy group); $R^8$ represents an aryl group (which is preferably a phenyl group which may have substituent(s) chosen preferably from among halogen atoms, alkyl, alkoxy, acyl, sulfonylamino, sulfamoyl, carbamoyl and alkoxycarbonyl groups); and $X^1$ represents a hydrogen atom or a splitting-off group (which may include any groups having the capability to be split off upon the oxidative condensation, with suitable examples including halogen atoms and groups attached to an active site via their nitrogen, oxygen or sulfur atom) and preferably represents a chlorine atom or a bromine atom.

Specific examples of compounds represented by the formula (II) are illustrated hereinafter.

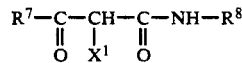

| No. | $R^7$ | $R^8$ | $X^1$ |
|---|---|---|---|
| II-1 | CH$_3$— | ⟨phenyl⟩ | Cl |
| II-2 | (CH$_3$)$_3$C— | " | ⟨dimethyl imide, N attached with two C=O and C(CH$_3$)$_2$⟩ |
| II-3 | " | ⟨2-chlorophenyl⟩ | " |
| II-4 | " | ⟨phenyl with NHCOCH$_3$ and Cl⟩ | Br |

-continued $$R^7-\underset{\underset{O}{\|}}{C}-\underset{\underset{X^1}{|}}{CH}-\underset{\underset{O}{\|}}{C}-NH-R^8$$

| No. | $R^7$ | $R^8$ | $X^1$ |
|---|---|---|---|
| II-5 | " | 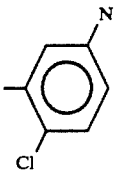 NHCOC₄H₉-t, Cl | Cl |
| II-6 | " | 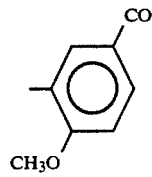 CONHC₃H₇-iso, CH₃O | 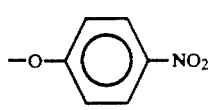 —O—⟨⟩—NO₂ |
| II-7 | 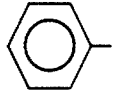 |  | H |
| II-8 | " | 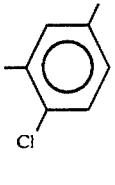 NHCOC₄H₉-t, Cl | " |
| II-9 | 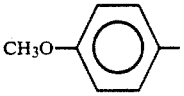 CH₃O— | 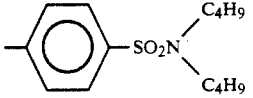 —⟨⟩—SO₂N(C₄H₉)₂ | 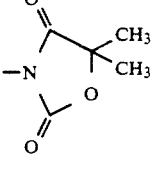 |
| II-10 | 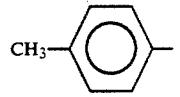 CH₃— | 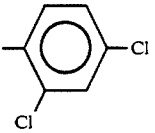 Cl, Cl | H |
| II-11 | " | 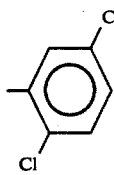 COOC₆H₁₃, Cl | H |
| II-12 | (CH₃)₃C— | 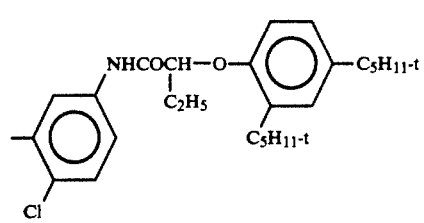 NHCOCH(C₂H₅)—O—⟨⟩(C₅H₁₁-t)₂, Cl | 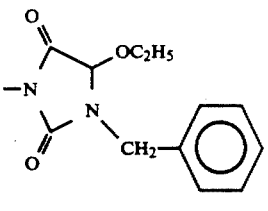 |

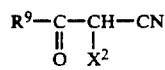

$$R^9-\underset{\underset{O}{\|}}{C}-\underset{\underset{X^2}{|}}{CH}-CN \quad \text{(III)}$$

In formula (III), $R^9$ represents an alkyl group (preferably one which contains 1 to 10 carbon atoms), an aryl group (preferably an optionally substituted phenyl group), or a heterocyclic group (preferably a 5- or 6-membered ring residue which contains oxygen, sulfur or nitrogen atom(s) as hetero atoms(s))); and $X^2$ represents a hydrogen atom, or a splitting-off group.

Specific examples of compounds represented by the formula (III) are illustrated below.

$$R^9-\underset{\underset{O}{\|}}{C}-\underset{\underset{X^2}{|}}{CH}-CN$$

| No. | $R^9$ | $X^2$ |
|---|---|---|
| III-1 | 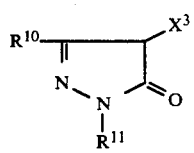 | H |
| III-2 | (thiophene) | " |
| III-3 | (quinoline) | " |
| III-4 | (phenyl) | " |

$$\text{(IV)}$$
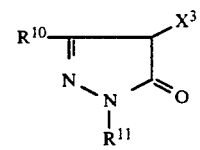

In formula (IV), $R^{10}$ represents an alkyl group (preferably one which contains 1 to 10 carbon atoms), an aryl group (preferably phenyl group), an amino group, an alkylamino group (preferably one which contains 1 to 10 carbon atoms), or an arylamino group (preferably an anilino group which may be substituted preferably by a halogen atom, an alkoxy group, an alkyl group, an acyl group, a sulfonylamino group, a sulfamoyl group, a carbamoyl group or an alkoxycarbonyl group), an acylamino group (preferably one which contains 2 to 15 carbon atoms), a carbamoyl group (preferably one which contains 2 to 15 carbon atoms), or an alkoxycarbonyl group (preferably one which contains 2 to 15 carbon atoms); $R^{11}$ represents an alkyl group (preferably one which contains 1 to 10 carbon atoms), or an aryl group (preferably a phenyl group which may be substituted preferably by a halogen atom, an alkoxy group or an alkyl group); and $X^3$ represents a hydrogen atom, or a splitting-off group. Specific examples of compounds represented by the formula (IV) are illustrated below.

| No. | $R^{10}$ | $R^{11}$ | $X^3$ |
|---|---|---|---|
| IV-1 | $CH_3$ | $CH_3$ | H |
| IV-2 | " | (tolyl) | " |
| IV-3 | $C_2H_5$ | " | Cl |
| IV-4 | (phenyl) | " | " |
| IV-5 | $CH_3-NH-$ | " | " |
| IV-6 | $(CH_3)_2N-$ | (chlorophenyl) | H |
| IV-7 | (phenyl-NH-) | " | " |
| IV-8 | " | (methoxyphenyl) | " |
| IV-9 | (2-chloroanilino) | (dichlorophenyl) | Cl |
| IV-10 | ($CH_3OC(O)$-, chloro-anilino) | (trichlorophenyl) | " |
| IV-11 | $t\text{-}C_4H_9CONH$-, chloroanilino | (phenyl) | " |
| IV-12 | $C_{12}H_{25}O-C(O)$-, chloroanilino | (trichlorophenyl) | " |

-continued

| No. | $R^{10}$ | $R^{11}$ | $X^3$ |
|---|---|---|---|
| IV-13 | CH₃—CNH—(=O) | phenyl | Cl |
| IV-14 | t-C₄H₉—C(=O)—NH— | phenyl | " |
| IV-15 | phenyl-C(=O)—NH— | 4-Cl-phenyl | H |
| IV-16 | CH₃NHCO— | 3-Cl-phenyl | " |

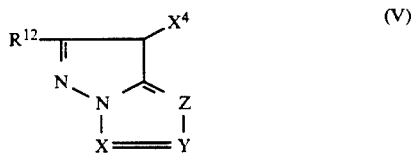

In formula (V), $R^{12}$ represents a hydrogen atom, a halogen atom, an alkyl group (preferably one which contains 1 to 10 carbon atoms), an alkoxy group (preferably one which contains 1 to 10 carbon atoms), an aryl group (preferably a phenyl group), an aryloxy group (preferably a phenoxy group), a cyano group, an acylamino group (preferably one which contains 2 to 15 carbon atoms), a sulfonylamino group (preferably one which contains 2 to 15 carbon atoms), an ureido group (preferably one which contains 2 to 15 carbon atoms), an alkoxycarbonylamino group (preferably one which contains 2 to 15 carbon atoms), an alkylthio group (preferably one which contains 1 to 10 carbon atoms), an arylthio group (preferably a phenylthio group), an alkoxycarbonyl group (preferably one which contains 2 to 15 carbon atoms), a carbamoyl group (preferably one which contains 2 to 15 carbon atoms), a sulfamoyl group (preferably one which contains 1 to 15 carbon atoms), a sulfonyl group (preferably one which contains 1 to 15 carbon atoms), an acyl group (preferably one which contains 2 to 15 carbon atoms), or amino group; $X^4$ represents a hydrogen atom, or a splitting-off group; and X, Y and Z each represents $$=\overset{R^{13}}{\underset{|}{C}}-,$$

or a nitrogen atom (wherein $R^{13}$ represents a hydrogen atom, an alkyl group, an aryl group, an alkoxy group, an aryloxy group, an amino group, a cyano group, a sulfonyl group, a sulfamoyl group, an acyl group, a carbamoyl group, an alkoxycarbonyl group, or an acylamino group).

Specific examples of compounds represented by the formula (V) are illustrated below.

(V)-a

| No. | $R^{12}$ | $R^{14}$ | $X^4$ |
|---|---|---|---|
| V-a-1 | phenyl | CH₃ | H |
| V-a-2 | (CH₃)₃C— | 2,4-di-Cl-phenyl | " |
| V-a-3 | CH₃ | " | " |
| V-a-4 | " | —CH₃ | Cl |
| V-a-5 | " | —CH—CH₂NHCOCH₃ <br>         \|<br>        CH₃ | H |
| V-a-6 | " | —CH—CH₂NHCOC₂H₅ <br>        \|<br>        CH₃ | " |
| V-a-7 | (CH₃)₃C— | phenyl-NHCOCH₃ | " |
| V-a-8 | C₂H₅O— | —CH₂CH₂NHSO₂CH₃ | " |
| V-a-9 | (CH₃)₃C— | —CH₃ | " |
| V-a-10 | C₂H₅— | —C(CH₃)₃ | " |
| V-a-11 | (CH₃)₃C— | —CH—CH₂NHCO—phenyl<br>        \|<br>        CH₃ | Br |
| V-a-12 | " | —CH—CH₂—N(phthalimido)<br>        \|<br>        CH₃ | " |
| V-a-13 | " | —CH—CH₂NHCOC(CH₃)₃<br>        \|<br>        CH₃ | " |
| V-a-14 | phenyl-SO₂—  | —CH₃ | H |
| V-a-15 | NC— | " | " |

-continued

V-a-16 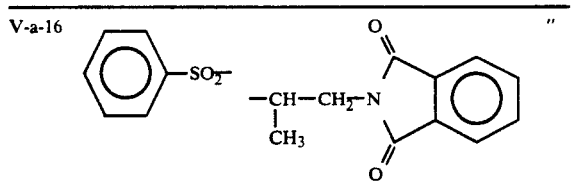 "

V-a-17 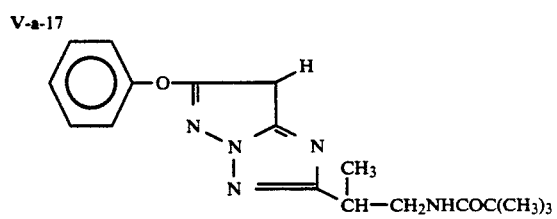

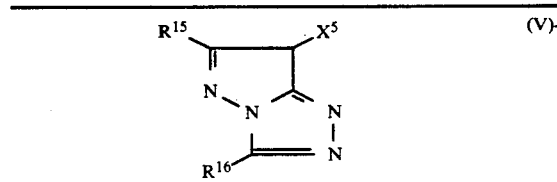 (V)-b

| No. | $R^{15}$ | $R^{16}$ | $X^5$ |
|---|---|---|---|
| V-b-1 | $CH_3-$ | $CH_3-$ | H |
| V-b-2 | $(CH_3)_2CH-$ | " | " |
| V-b-3 | $CH_3-$ | $CH_3SO_2CH_2CH_2-$ | " |
| V-b-4 | " | 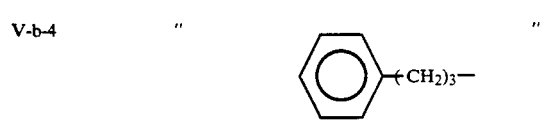 | " |
| V-b-5 | " | $CH_3OCH_2CH_2-$ | " |
| V-b-6 | $(CH_3)_3C-$ | $CH_3-$ | " |
| V-b-7 | $(CH_3)_2CH-$ | $CH_3SO_2-$ | " |
| V-b-8 |  | 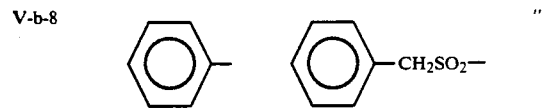 | " |
| V-b-9 | $CH_3O-$ | $CH_3SO_2-$ | " |
| V-b-10 |  | $CH_3-$ | " |

 (V)-c

| No. | $R^{17}$ | $X^6$ |
|---|---|---|
| V-c-1 | $CH_3-$ | H |
| V-c-2 | $(CH_3)_2CH-$ | " |
| V-c-3 | $(CH_3)_3C-$ | " |
| V-c-4 | 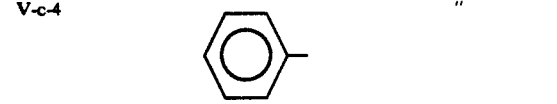 | " |
| V-c-5 | $CH_3SO_2-$ | " |

-continued

V-c-6 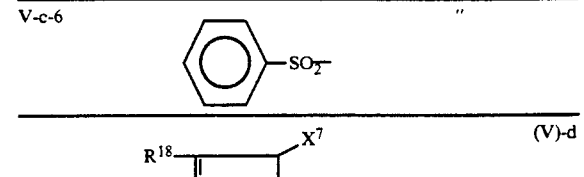 "

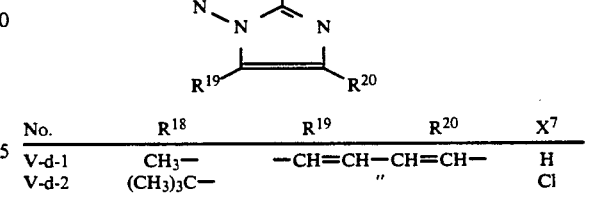 (V)-d

| No. | $R^{18}$ | $R^{19}$ | $R^{20}$ | $X^7$ |
|---|---|---|---|---|
| V-d-1 | $CH_3-$ | $-CH=CH-CH=CH-$ | | H |
| V-d-2 | $(CH_3)_3C-$ | " | | Cl |
| V-d-3 | 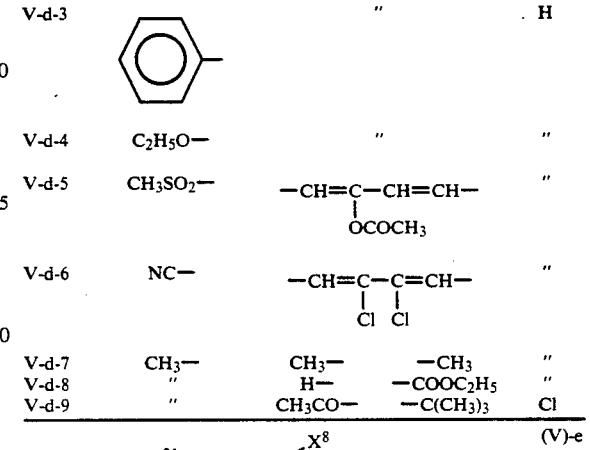 | " | | H |
| V-d-4 | $C_2H_5O-$ | " | | " |
| V-d-5 | $CH_3SO_2-$ | $-CH=C-CH=CH-$<br>$\quad\quad\;\; \mid$<br>$\quad\quad\;\; OCOCH_3$ | | " |
| V-d-6 | $NC-$ | $-CH=C-C=CH-$<br>$\quad\quad\;\; \mid\;\;\; \mid$<br>$\quad\quad\;\; Cl\;\; Cl$ | | " |
| V-d-7 | $CH_3-$ | $CH_3-$ | $-CH_3$ | " |
| V-d-8 | " | $H-$ | $-COOC_2H_5$ | " |
| V-d-9 | " | $CH_3CO-$ | $-C(CH_3)_3$ | Cl |

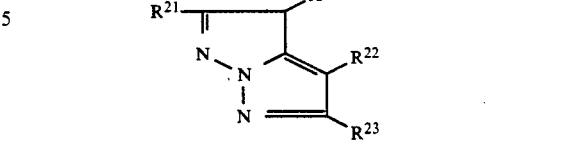 (V)-e

| No. | $R^{21}$ | $R^{22}$ | $R^{23}$ | $X^8$ |
|---|---|---|---|---|
| V-e-1 | $CH_3-$ | $-H$ | $-CH_3$ | H |
| V-e-2 | 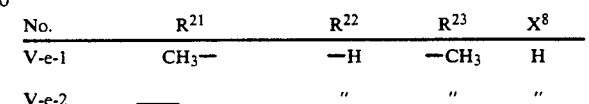 | " | " | " |
| V-e-3 | 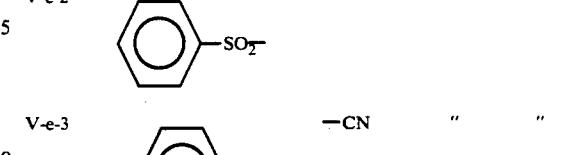 | $-CN$ | " | " |

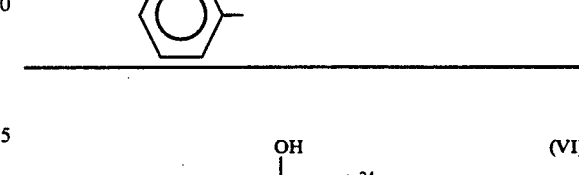 (VI)

In formula (VI), Q represents atoms necessary to complete a carbon ring constituted by 5 or more members, or a nitrogen-containing hetero ring constituted by 5 or more members. As for Q to complete a carbon ring, those which constitute a 6-membered ring represented by the following formula (VI)-A are preferable:

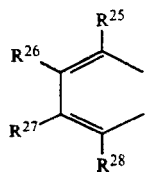 (VI)-A

In the above formula (VI)-A, $R^{25}$ to $R^{28}$ have the same meanings as $R^1$ to $R^4$ heretofore defined with respect to general formula (I), but it is particularly preferred that each represents a hydrogen atom.

As for Q to complete a ring containing at least one nitrogen atom, those which are represented by the following formula (VI)-B or (VI)-C are preferable:

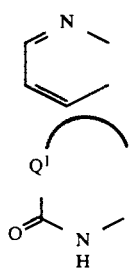

(VI)-B (VI)-C

In the above formula (VI)-C, $Q^1$ represents a divalent amino group, an ether bond, a thioether bond, an alkylene group, an ethylene bond, an imino bond, a sulfonyl group, a carbonyl group, an arylene group, a divalent residue of a heterocyclic ring, or a group formed by combining two or more of the above-cited groups. Among these groups, those represented by the following formulae,

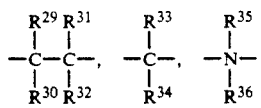

are most preferred. Therein, $R^{29}$ to $R^{36}$ each represents a hydrogen atom, or a group which can be attached to the carbon or the nitrogen in the above formulae (with specific examples including an alkyl group containing 1 to 6 carbon atoms, an aryl group containing 6 to 10 carbon atoms and a halogen atom).

$R^{24}$ in the formula (VI) has the same meaning as heretofore defined groups $R^1$ to $R^4$ in general formula (I). When Q represents the moiety of the formula (VI)-A or (VI)-B, groups preferred as $R^{24}$ include carbamoyl groups containing 2 to 8 carbon atoms (e.g., methylcarbamoyl, ethylcarbamoyl, butylcarbamoyl, isopropylcarbamoyl, t-butylcarbamoyl, cyclopentylcarbamoyl, cyclohexylcarbamoyl, methoxyethylcarbamoyl, chloroethylcarbamoyl, cyanoethylcarbamoyl, benzylcarbamoyl, furfurylcarbamoyl, tetrahydrofurfurylcarbamoyl, phenoxymethylcarbamoyl, allylcarbamoyl, phenylcarbamoyl, 2-pyridylcarbamoyl). On the other hand, those preferred as $R^{24}$ when Q represents the moiety of the formula (VI)-C include acylamino groups containing 1 to 10 carbon atoms (e.g., acetylamino, propionylamino, isobutyroylamino, hexahydrobenzoylamino, pivaloylamino, trifluoroacetylamino, heptafluorobutyroylamino, chloropropionylamino, cyanoacetylamino, phenoxyacetylamino, acryloylamino, benzoylamino, p-trifluoromethylbenzoylamino, picolinoylamino, nicotinoylamino, thenoylamino, furoylamino).

$X^9$ in the formula (VI) represents a hydrogen atom, or a splitting-off group.

Specific examples of compounds represented by the general formula (VI) are illustrated below.

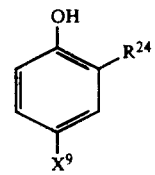

| No. | Q | $R^{24}$ | $X^9$ |
|---|---|---|---|
| VI-1 | ![cyclohexenyl] | —CONHCH$_3$ | H |
| VI-2 | " | —CONHC$_2$H$_5$ | " |
| VI-3 | " | —CONHC$_3$H$_7$-iso | " |
| VI-4 | " | —CONH—⟨cyclohexyl⟩ | Cl |
| VI-5 | " | —CONHC$_4$H$_9$-t | " |
| VI-6 | " | —CONH—⟨phenyl⟩ | H |
| VI-7 | ![cyclohexenyl with NHCOOCH$_3$] | —CONHCH$_3$ | " |
| VI-8 | ![cyclohexenyl with NHCOC$_3$H$_7$-iso] | —CONH—C$_2$H$_5$ | " |
| VI-9 | ![N-containing ring] | —CONH—CH$_3$ | " |
| VI-10 | ![CH$_3$,CH$_3$ branched with amide] | —NHCOCF$_3$ | Cl |
| VI-11 | " | —NHCOC$_3$F$_7$ | " |
| VI-12 | " | —NHCOCH$_3$ | " |
| VI-13 | " | —NHCOC$_3$H$_7$-iso | " |
| VI-14 | " | —NHCOC$_4$H$_9$-t | " |

-continued

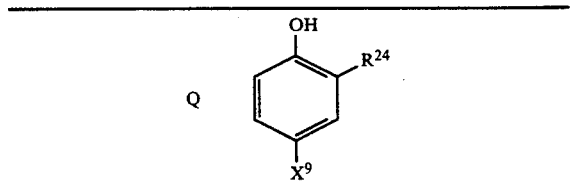

| No. | Q | $R^{24}$ | $X^9$ |
|---|---|---|---|
| VI-15 | " | —NHCO—⟨phenyl⟩ | " |
| VI-16 | " | —NHCO—⟨furan⟩ | |
| VI-17 | (CH₃)₂C(C(=O)NH—) | —NHCOCF₃ | " |
| VI-18 | " | —NHCOC₄H₉-t | " |

Among them, VI-1, VI-10, VI-13, and VI-14 are particularly preferable in the present invention.

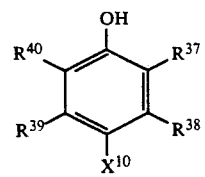

In formula (VII), $R^{37}$ to $R^{40}$ have the same meanings as $R^1$ to $R^4$ in the general formula (I), respectively.

Those preferred as $R^{37}$ include acylamino groups containing 1 to 10 carbon atoms (e.g., acetylamino, propionylamino, isobutyrolylamino, hexahydrobenzoylamino, pivaloylamino, trifluoroacetylamino, heptafluorobutyrolylamino, chloropropionylamino, cyanoacetylamino, phenoxyacetylamino, acryloylamino, benzoylamino, p-trifluoromethylbenzoylamino, picolinoylamino, nicotinoylamino, isonicotinoylamino, thenoylamino, furoylamino).

Among the groups represented by $R^{38}$, a hydrogen atom is preferred.

Among the groups represented by $R^{39}$, acylamino groups containing 2 to 8 carbon atoms and alkyl groups containing 1 to 4 carbon atoms are preferred.

Those preferred as $R^{40}$ include a hydrogen atom and halogen atoms.

$X^{10}$ in the foregoing formula (VII) represents a splitting-off group.

Specific examples of compounds represented by the general formula (VII) are illustrated below.

$$\text{(VII structure with } R^{40}, R^{37}, R^{39}, R^{38}, X^{10}, OH)$$

| No. | $R^{37}$ | $R^{38}$ | $R^{39}$ | $R^{40}$ | $X^{10}$ |
|---|---|---|---|---|---|
| VII-1 | —NHCOCH₃ | —H | CH₃— | Cl— | Cl— |
| VII-2 | " | " | C₂H₅— | " | " |
| VII-3 | —NHCOC₂H₅ | " | " | " | " |
| VII-4 | —NHCOC₃H₇-iso | " | CH₃— | " | " |
| VII-5 | —NHCOC₄H₉-t | " | " | " | " |
| VII-6 | —NHCO—⟨phenyl⟩ | " | C₂H₅— | " | " |
| VII-7 | " | " | CH₃— | " | " |
| VII-8 | —NHCO—⟨furan⟩ | " | " | " | " |
| VII-9 | " | " | C₂H₅— | " | " |
| VII-10 | —NHCO—⟨thiophene⟩ | " | " | " | " |
| VII-11 | —NHCO—⟨pyridine⟩ | " | CH₃— | " | " |
| VII-12 | " | " | C₂H₅— | " | " |

-continued

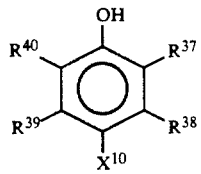

| No. | R³⁷ | R³⁸ | R³⁹ | R⁴⁰ | X¹⁰ |
|---|---|---|---|---|---|
| VII-13 | —NHCO—(pyridyl) | " | " | " | " |
| VII-14 | —NHCO—(pyridyl) | " | CH₃— | " | " |
| VII-15 | —NHCO—(cyclohexyl) | " | " | CH₃— | H |
| VII-16 | —NHCOCH₂—(phenyl) | " | C₂H₅— | Cl | Cl |
| VII-17 | —NHCOCF₃ | " | CH₃CONH— | H | H |
| VII-18 | —NHCOC₃F₇ | " | " | " | " |
| VII-19 | —NHCOCH₃ | " | (succinimido) | " | " |
| VII-20 | —NHCO—(furyl) | " | iso-C₃H₇CONH— | " | " |
| VII-21 | —NHCOCH₃ | " | H | " | " |

Any oxidizing agents can be used in the practice of the present invention as long as they can function to oxidize p-phenylenediamines. For instance, persulfates (e.g., sodium persulfate, potassium persulfate, and ammonium persulfate) ferricyanides, hypochlorites and silver nitrate can be used. In particular, persulfates can be preferably used.

The pH value of the reaction solution in the present invention is controlled to generally from 8 to 13.5, preferably from 9 to 12 with a base.

The base is not particularly limited with respect to kind. Specific examples thereof include alkaline carbonates, sodium hydroxide, potassium hydroxide, ammonia, and triethylamine. Alkaline carbonates such as sodium carbonate and potassium carbonate can be preferably used.

As for the solvent, a methylene chloride-water two-phase system is used. However, a more desirable result can be achieved when a solvent compatible with each solvent (e.g., alcohols, amides), especially isopropanol or ethanol, is additionally used.

Also, a solvent incompatible with water (e.g., ethyl acetate) may be used in the form of mixture with methylene chloride.

A ratio among the ingredients to be used in the reaction does not have any particular limitation. However, it is desirable that a ratio among a p-phenylenediamine to be used in the present invention, an oxidizing agent, a base and an active methylene or methine compound should range from 1-2: 1-4:3-10:1, by mole. The solvents also do not have any particular limitation regarding their respective proportions to each other. However, it is to be desired that 5 to 30 ml of methylene chloride, 5 to 30 ml of water, and 2 to 15 ml of isopropanol or ethanol should be used per 1 g of the active methylene or methine compound.

The reaction temperature is generally 50° C. or less, preferably from 5° to 30° C. in the present invention.

The reaction time is preferably from 5 minutes to 1 hour in the present invention.

After completion of the reaction in a two-phase system, the reaction solution is subjected to a separating procedure to isolate the methylene chloride phase. After optionally washing with water, the methylene chloride solution is concentrated, and thereto is added a crystallizing solvent, such as methanol. Thus, an intended azomethine or indoaniline dye precipitates as crystals.

The production method of this invention is characterized by reduced amounts of solvents, little by-products and high yield rate. Accordingly, the low productivity problem which is a serious defect associated with the conventional method of producing azomethine or indoaniline series dyes by oxidative condensation can be solved by the present invention.

This invention will now be illustrated in more detail by reference to the following examples. However, the invention should not be construed as being limited to these examples.

EXAMPLE 1

Synthesis of Following Compound

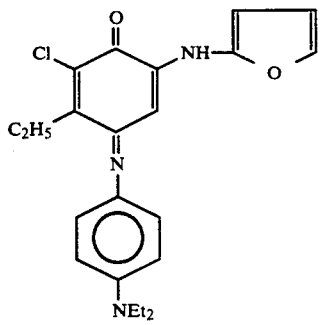

A mixture of 6.0 g of an active methine compound, VII-9, 50 ml of methylene chloride and 25 ml of isopropanol was stirred in an ice bath. Thereto, a solution containing 8.3 of the sulfate of a p-phenylenediamine, I-1, in 26 ml of water, a solution containing 2.4 g of sodium hydroxide and 4.2 g of sodium carbonate in 40 ml of water, and a solution containing 7.2 g of ammonium persulfate in 26 ml of water were successively added in that order, and stirred for 30 minutes to complete the reaction. The pH value of the reaction solution was about 11. During the reaction, the bath temperature of the reaction system was kept at 25° C. or lower. After the separation with a separatory funnel, the methylene chloride phase was washed once with water. The methylene chloride was distilled away until the content was reduced to about 15 ml of residue. Thereto, 60 ml of warmed methanol was added, and stirred for 2 hours at room temperature. The thus separated crystals were filtered off, and washed with methanol. Thus, 7.3 g of the desired product was obtained in a yield rate of 85.7 %, and a melting point thereof was 119°–120° C.

COMPARATIVE EXAMPLE 1-1

The synthesis was carried out in the same manner as in Example 1, except that methylene chloride was replaced by ethyl acetate. In this case, the reaction mixture was not able to properly separate into two intended solutions during the separating procedure since the desired product prematurely precipitated as crystals in a fairly large quantity. Therefore, once the crystals were filtered off, it was necessary to then repeat the separation procedure on the solutions, and, furthermore, washing with water. In addition, the yield rate was 76.8 %, and the melting point of the product obtained was 118°–119° C.

COMPARATIVE EXAMPLE 1-2

The synthesis was carried out in the same manner as in Example 1, except that methylene chloride was replaced by chloroform. In this case, the yield rate was 65.7%, and the melting point of the product obtained was 119°–120° C.

EXAMPLE 2

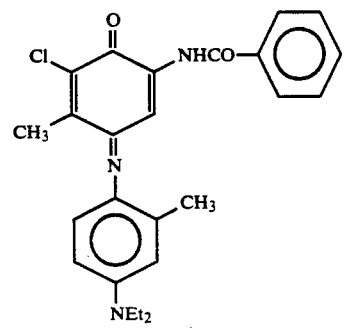

Synthesis of Following Compound

A mixture of 5.9 g of an active methine compound, VII-7, 50 ml of methylene chloride and 20 ml of ethanol was stirred in an ice bath. Thereto, a solution containing 10.6 g of sodium carbonate in 60 ml of water, a solution containing 7.9 g of the hydrochloride of a p-phenylenediamine, I-2, in 25 ml of water, and a solution containing 7.2 g of ammonium persulfate in 25 ml of water were successively added in that order, and stirred for 20 minutes to complete the reaction. The pH value of the reaction solution was about 11. During the reaction, the bath temperature of the reaction system was kept at 30° C. or lower. After the separation with a separatory funnel, the methylene chloride phase was washed once with water. The methylene chloride was distilled away to obtain a residue. The residue was admixed with 80 ml of warmed methanol, and stirred for 1.5 hours at room temperature. The thus precipitated crystals were filtered off, and washed with methanol. Thus, 7.3 g of the desired product was obtained in a yield rate of 83.7 %, and a melting point thereof was 136° to 137° C.

COMPARATIVE EXAMPLE 2-1

The synthesis was carried out in the same manner as in Example 2, except that methylene chloride was replaced by ethyl acetate. In this case, the reaction mixture was not able to separate into two intended solutions during the separating procedure since the desired product prematurely precipitated as crystals in a fairly large quantity. Therefore, once the crystals filtered off, it was necessary to then repeat the separation solution on the solutions, and, furthermore, washing with water. In addition, the yield rate was 80.1 %, and the melting point of the product obtained was 136°–137° C.

COMPARATIVE EXAMPLE 2-2

The synthesis was carried out in the same manner as in Example 2, except that methylene chloride was replaced by chloroform. In this case, the yield rate was

EXAMPLE 3

Synthesis of Following Compound

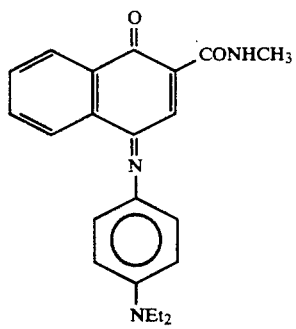

A mixture of 4.0 g of an active methine compound, VI-1, 40 ml of methylene chloride and 25 ml of ethanol was stirred in an ice bath. Thereto, a solution containing 7.3 of the sulfate of a p-phenylenediamine, I-1, in 25 ml of water, a solution containing 13.8 g of potassium carbonate in 100 ml of water, and a solution containing 12.8 g of ammonium persulfate in 40 ml of water were successively added in that order, and stirred for 30 minutes to complete the reaction. The pH value of the reaction solution was about 11. During the reaction, the bath temperature of the reaction system was kept at 25° C. or lower. After the separation with a separatory funnel, the methylene chloride phase was washed once with water. The methylene chloride was distilled away till the content was reduced to about 10 ml. Thereto, 40 ml of warmed methanol was added, and stirred for 1 hour at room temperature and for additional 1 hour under cooling with an ice bath. The thus precipitated crystals were filtered off, and washed with chilled methanol Thus, 5.8 g of the desired product was obtained in a yield rate of 80.8 %, and a melting point thereof was 133°–134° C.

COMPARATIVE EXAMPLE 3-1

The synthesis was carried out in the same manner as in Example 3, except that methylene chloride was replaced by ethyl acetate. In this case, the reaction mixture was not able to segregate into two intended solutions during the separating procedure since the desired product prematurely precipitated as crystals in a fairly large quantity. Therefore, by further adding 100 ml of ethyl acetate thereto, the reaction mixture was rendered separable, which consequently was attended by the disadvantages of making the separation procedure more complicated and increasing an amount of the solvent needed. In addition, the yield rate was 78.9 %, and the melting point of the product obtained was 133°–134° C.

COMPARATIVE EXAMPLE 3-2

The synthesis was carried out in the same manner as in Example 3, except that methylene chloride was replaced by chloroform. In this case, the yield rate was 75.1 %, and the melting point of the product obtained was 132°–133° C.

EXAMPLE 4

Synthesis of Following Compound

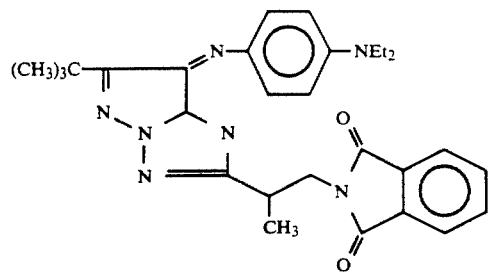

A mixture of 10.0 g of an active methine compound, V-a-12, 150 ml of methylene chloride, 150 ml of ethyl acetate and 100 ml of isopropanol was stirred in an ice bath. Thereto, a solution containing 1.8 g of sodium hydroxide and 17.7 g of sodium carbonate in 280 ml of water, 13 g of the sulfate of a p-phenylenediamine, I-1, and 11.3 g of ammonium persulfate were successively added in that order, and stirred for 20 minutes to complete the reaction. The pH value of the reaction solution was about 11. During the reaction, the bath temperature of the reaction system was kept at 25° C. or lower. After the separation with a separatory funnel, the methylene chloride phase was washed once with water. The methylene chloride was distilled away until the content was reduced to about 50 ml of residue. The residue was admixed with 100 ml of warmed methanol, and stirred for 2 hours at room temperature. The thus precipitated crystals were filtered off, and washed with methanol. Thus, 12.7 g of the desired product was obtained in a yield rate of 87.4 %, and a melting point thereof was 184°–185° C.

COMPARATIVE EXAMPLE 4-1

The synthesis was carried out in the same manner as in Example 4, except that the mixture of 150 ml of methylene chloride with 150 ml of ethyl acetate was replaced by 300 ml of ethyl acetate. In this case, the desired product prematurely precipitated as crystals in a fairly large quantity in the course of the reaction, so part of the crystals had to be taken out by an initial filtration procedure, and then the separation procedure on the solutions had to be repeated. That is, a more complicated scheme was necessary to isolate the dye product. In addition, the yield rate was 80.2 %, and the melting point of the product obtained was 184°–185° C.

COMPARATIVE EXAMPLE 4-2

The synthesis was carried out in the same manner as in Example 4, except that methylene chloride was replaced by chloroform. In this case, the yield rate was 83.5%, and the melting point of the product obtained was 183°–184° C.

EXAMPLES 5 TO 17

Syntheses were carried out in the same manner as in Example 1, except that reactants and reaction conditions were selected in the manner shown in the following table. The results thus obtained are summarized in the table.

TABLE

| | Active Methine or Active Methylene Compound | p-Phenylenediamines | Solvent | Base | Oxidizing Agent | Azomethine or Indoaniline Dye | Yield Rate (%) | mp (°C.) |
|---|---|---|---|---|---|---|---|---|
| Example 5 | II-4 | I-1 | Methylene chloride/isopropanol/water | Sodium carbonate | Ammonium persulfate | (CH₃)₃C—COC—CONH— (Cl)(NHCOCH₃)—N=—NEt₂ | 75.5 | 217~9 |
| Example 6 | II-2 | I-19 | Methylene chloride/ethyl acetate/isopropanol/water | " | " | (CH₃)₃C—COC—CONH—Ph, N=—(CH₃)—C₂H₅—N—C₂H₄NHSO₂CH₃ | 61.2 | 142~3 |
| Example 7 | II-7 | I-20 | Methylene chloride/ethanol/water | " | Potassium persulfate | Ph—COCCONH—Ph, N=—(CH₃)—CH₃—N—CH₃ | 74.8 | 195~6 |

TABLE-continued

| | Active Methine or Active Methylene Compound | p-Phenylene-diamines | Solvent | Base | Oxidizing Agent | Azomethine or Indoaniline Dye | Yield Rate (%) | mp (°C.) |
|---|---|---|---|---|---|---|---|---|
| Example 8 | III-1 | I-1 | Methylene chloride/ethanol/water | Sodium carbonate | Ammonium persulfate | (structure) | 68.5 | 170~2 |
| Example 9 | IV-10 | I-2 | Methylene chloride/ethanol/water | " | " | (structure) | 79.2 | 257~8 |
| Example 10 | V-a-1 | I-10 | Methylene chloride/ethanol/water | Potassium carbonate | " | (structure) | 83.0 | 184~5 |

TABLE-continued

| Example | Active Methine or Active Methylene Compound | p-Phenylene-diamines | Solvent | Base | Oxidizing Agent | Azomethine or Indoaniline Dye | Yield Rate (%) | mp (°C.) |
|---|---|---|---|---|---|---|---|---|
| Example 11 | V-a-2 | I-10 | Methylene chloride/iso-propanol/water | Sodium carbonate | Ammonium persulfate | 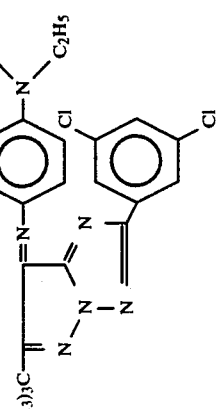 | 82.1 | 225~6 |
| Example 12 | V-a-4 | I-21 | Methylene chloride/iso-propanol/water | " | " | 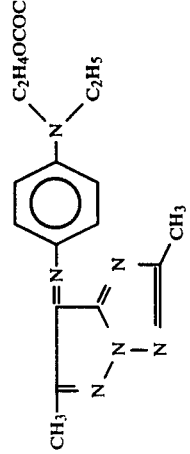 | 79.1 | 195~6 |
| Example 13 | V-d-1 | I-2 | Methylene chloride/iso-propanol/water | " | Potassium ferricyanide | 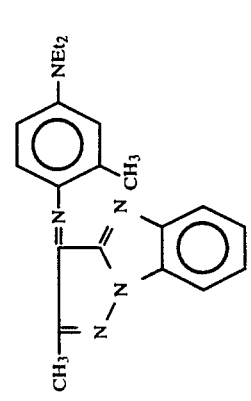 | 62.5 | 176~7 |
| Example 14 | V-d-3 | " | Methylene chloride/iso-propanol/water | " | Silver nitrate | 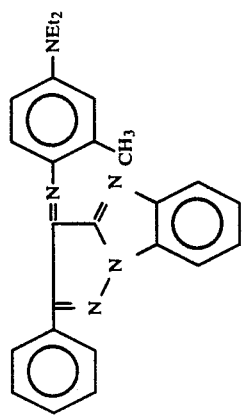 | 75.6 | 181~2 |

TABLE-continued

| | Active Methine or Active Methylene Compound | p-Phenylenediamines | Solvent | Base | Oxidizing Agent | Azomethine or Indoaniline Dye | Yield Rate (%) | mp (°C.) |
|---|---|---|---|---|---|---|---|---|
| Example 15 | VI-7 | I-1 | Methylene chlorinde/iso-propanol/water | Tiethylamine | Ammonium persulfate | (structure with CONHCH₃, O, NH, CH₃O—C=O, N=, NEt₂) | 78.5 | 217~8 |
| Example 16 | VI-10 | I-2 | Methylene chlorinde/iso-propanol/water | Sodium carbonate | " | (structure with NHCOCF₃, O, CH₃, N-H, O, N=, NEt₂) | 82.6 | 175~6 |
| Example 17 | VII-1 | I-1 | Methylene chlorinde/iso-propanol/water | " | " | (structure with NHCOCH₃, O, Cl, CH₃, N=, NEt₂) | 83.2 | 178~9 |

While the invention has been described in detail and with reference to specific embodiments thereof, it will be apparent to one skilled in the art that various changes and modifications can be made therein without departing from the spirit and scope thereof.

What is claimed is:

1. A method for producing an azomethine or indoaniline series dye, which comprises oxidatively condensing an active methylene- or methine-containing compound, except those containing a sulfonic or carboxylic acid group, and p-phenylenediamine, except those containing a sulfonic or carboxylic acid group, in the presence of a solvent system comprising 5 to 30 ml of methylene chloride, 5 to 30 ml of water, and 2 to 15 ml of isopropanol or ethanol per 1 g of said active methylene- or methine-containing compound under a basic pH condition, and wherein said p-phenylenediamine is represented by formula (I):

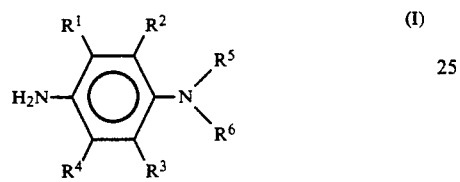

wherein $R^1$, $R^2$, $R^3$, and $R^4$ each represents a hydrogen atom, a halogen atom, an alkyl group, an alkoxy group, an aryl group, an aryloxy group, a cyano group, and acylamino group, a sulfonylamino group, an ureido group, an alkoxycarbonylamino group, an alkylthio group, an arylthio group, an alkoxycarbonyl group, a carbamoyl group, a sulfamoyl group, a sulfonyl group or an acyl group;

$R^5$ represents an alkyl group or an aryl group; and $R^6$ represents a hydrogen atom or may be the same as $R^5$, provided that $R^5$ and $R^6$ may combine with each other to complete a ring; and furthermore $R^2$ and $R^5$, and/or $R^3$ and $R^6$ may combine with each other to complete a ring; and each $R^1$, $R^2$, $R^3$, $R^4$, $R^5$ and $R^6$ may be substituted or unsubstituted, and wherein said active methylene- or methine-containing compound is represented by one of formulae (II) to (VII):

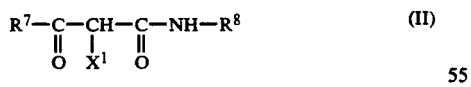

wherein $R^7$ represents an alkyl group or an optionally substituted phenyl group, $R^8$ represents an aryl group, and $X^1$ represents a hydrogen atom or a splitting-off group;

wherein $R^9$ represents an alkyl group, an aryl group, or a heterocyclic group, and $X^2$ represents a hydrogen atom, or a splitting-off group;

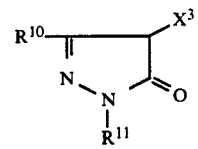

wherein $R^{10}$ represents an alkyl group, an aryl group, an amino group, an alkylamino group, or an arylamino group, an acylamino group, a carbamoyl group, or an alkoxycarbonyl group, $R^{11}$ represents an alkyl group, or an aryl group, and $X^3$ represents a hydrogen atom, or a splitting group;

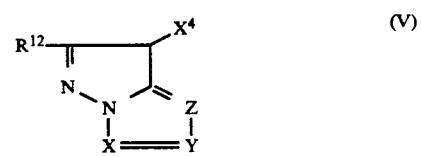

wherein $R^{12}$ represents a hydrogen atom, a halogen atom, an alkyl group, an alkoxy group, an aryl group, an aryloxy group, a cyano group, an acylamino group, a sulfonylamino group, an ureido group, an alkoxycarbonylamino group, an alkylthio group, an arylthio group, an alkoxycarbonyl group, a carbamoyl group, a sulfamoyl group, a sulfonyl group, an acyl group, or amino group, $X^4$ represents a hydrogen atom, or a splitting group, and X, Y and Z each represents

or a nitrogen atom, wherein $R^{13}$ represents a hydrogen atom, an alkyl group, an aryl group, an alkoxy group, an aryloxy group, an amino group, a cyano group, a sulfonyl group, a sulfamoyl group, an acyl group, a carbamoyl group, an alkoxycarbonyl group, or an acylamino group;

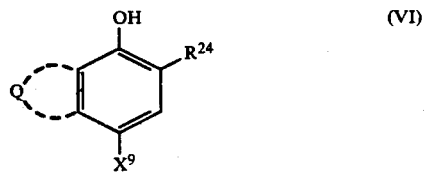

wherein Q represents atoms necessary to complete a carbon ring constituted by 5 or more members, or a nitrogen-containing hetero ring constituted by 5 or more members, $X^9$ represents a hydrogen atom, or a splitting-off group, and $R^{24}$ represents a hydrogen atom, a halogen atom, an alkyl group, an alkoxy group, an aryl group, a aryloxy group, a cyano group, an acylamino group, a sulfonylamino group, an ureido group, an alkoxycarbonylamino group, an alkylthio group, an arylthio group, an alkoxycarbonyl group, a carbamoyl group, a sulfamoyl group, a sulfonyl group or an acyl group;

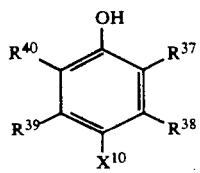

(VII)

wherein $R^{37}$ to $R^{40}$ have the same meaning as $R^{24}$ in formula (VI), and $X^{10}$ represents a splitting-off group.

2. A method for producing an azomethine or indoaniline series dye as in claim 1, wherein oxidizing agents are included which function to oxidize said p-phenylenediamine.

3. A method for producing an azomethine or indoaniline series dye as in claim 1, wherein said oxidizing agents are selected from the group consisting of persulfates, ferricyanides, hypochlorites and nitrates.

4. A method for producing an azomethine or indoaniline series dye as in claim 1, wherein the pH value of the reaction solution is adjusted to from 8 to 13.5 with a base.

5. A method for producing an azomethine or indoaniline series dye as in claim 4, wherein the proportions of said p-phenylenediamine, said oxidizing agent, said base and said active methylene- or methine-containing compound are from 1-2:1-4:3-10:1 by mole, respectively.

6. A method for producing an azomethine or indoaniline series dye as in claim 1, wherein the reaction temperature is from 5° to 30° C.

7. A method for producing an azomethine or indoaniline series dye as in claim 1, wherein the reaction time ranges from 5 minutes to 1 hour.

8. A method for producing an azomethine or indoaniline series dye as in claim 1, wherein after completion of the reaction in a two-phase system, the reaction solution is subjected to a separating procedure to remove the methine chloride phase which is thereafter optionally washed with water; then the methylene chloride solution is concentrated into a residue; and thereafter a crystallizing solvent is added to the residue which precipitates the dye product as a recoverable crystalline form.

* * * * *